Figure 1:
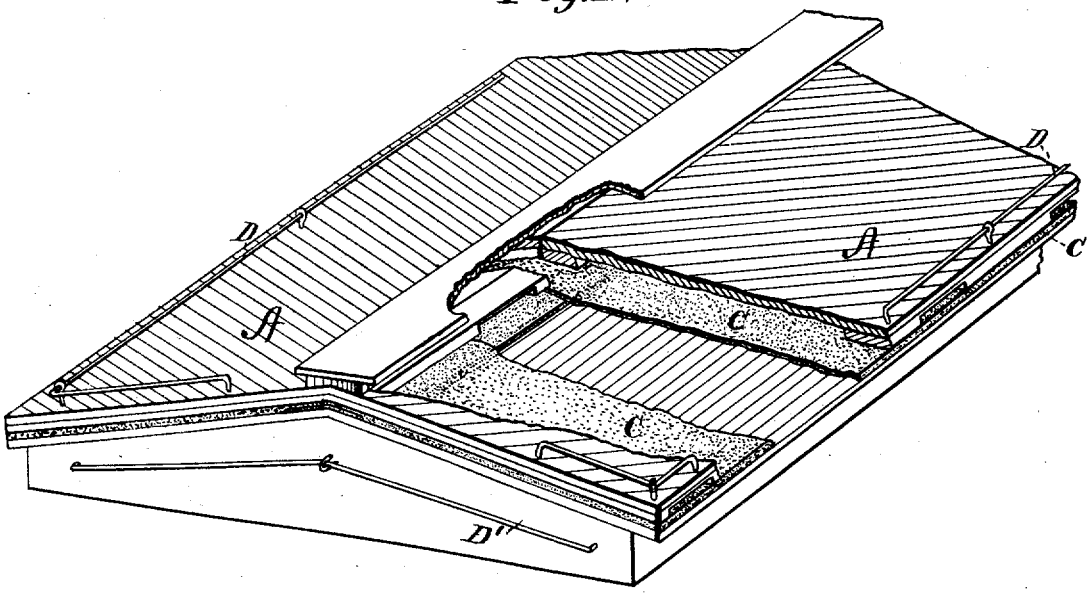

J. M. AYER.

CAR-ROOF.

No. 7,391. Reissued Nov. 14, 1876.

Witnesses

Pennington Halsted

P. McNickle

Inventor

John M. Ayer.

by John J. Halsted his atty.

UNITED STATES PATENT OFFICE.

JOHN M. AYER, OF CHICAGO, ILLINOIS.

IMPROVEMENT IN CAR-ROOFS.

Specification forming part of Letters Patent No. 180,088, dated July 18, 1876; reissue No. 7,391, dated November 14, 1876; application filed October 16, 1876.

*To all whom it may concern:*

Be it known that I, JOHN M. AYER, of Chicago, in the county of Cook and State of Illinois, have invented certain new and useful Improvements in Roofs for Railway-Cars, &c.; and I do hereby declare that the following is a full, clear, and exact description thereof, which will enable others skilled in the art to which it appertains to make and use the same, reference being had to the accompanying drawings, and to the letters of reference marked thereon, which form a part of this specification.

The object of this invention is to provide a roof for cars or carriages and other structures, which shall be both heat and water repellent, and positively impervious to either under all circumstances, and even though the boards of the roof may expand or contract, warp or separate, under changes of temperature or from other causes, and also to make it lighter than ordinary roofs, and at the same time economically.

The invention consists, essentially, in the combination, with an internal lining, of india-rubber, or the material termed "rubber packing," surfacing the same; in combining india-rubber or rubber packing with the outer covering or exterior of the roof; in combining, with the external covering and with the inner lining, an intermediate sheet or coating of rubber or rubber packing; and in combining, with such outer cover, inner lining, and intermediate rubber, an air-chamber above the rubber, and provided with air inlets and outlets.

The accompanying drawings show the application of my invention to railway-cars only; but I do not confine myself to this alone, as it is equally applicable to the roofs of houses, carriages, and the decks of vessels.

Hitherto it has been customary to cover cars with double boards, in close contact with each other, or with boards and metal in combination; but this method is by no means as satisfactory in its results as mine of employing india-rubber or rubber packing as a lining, inasmuch as this material is a non-conductor of heat, and non-oxidizable when exposed to the action of the air or weather, besides being much lighter. Moreover, when subjected to sudden or violent strains or concussions, or to the incessant pounding and jarring which are unavoidable when the cars are running, the rubber or rubber packing is far preferable to metal, inasmuch as it has no seams which can open and admit either heat or moisture, and hence no joints to loosen or rivets to displace. It is superior also to wood, being even a better non-conductor of heat, and wood cannot, when used alone, be so put together as to remain water-tight for any considerable length of time.

Under my improved roof, by reason of the valuable properties of india-rubber as a non-conductor of heat, as well as a repellent of wet or moisture, fruit, fish, grain, flour, &c., may be transported long distances without suffering injury from changes of temperature, thus obviating serious loss to shippers and others.

Figure 2:
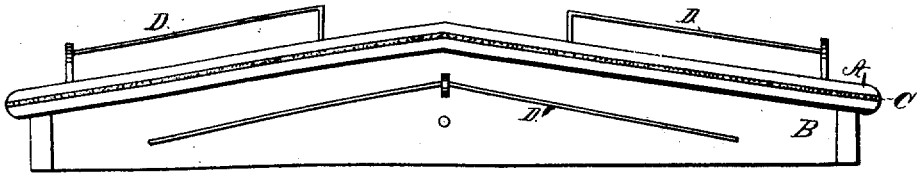
Figure 3:
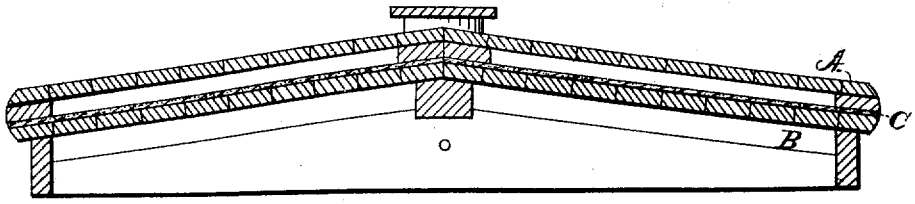

Referring to the drawings, Figure 1 is a perspective view of a car-roof illustrating my invention; Fig. 2, an end view, and Fig. 3 a vertical transverse section.

A is an exterior board covering; B, an interior layer of boards, and C the intermediate non-conducting and water-proof material, made of india-rubber or rubber packing, and which may be fastened to the internal layer B by a shellac or other cement, or by means of tacks, nails, or the like. This rubber sheathing may be in a single piece or sheet for the whole roof; or it may be in two pieces, each a little more than half the width of the roof, and lapping each other along the center lengthwise of the car; and in this latter case a separate or re-enforcing strip of the same material may be laid over the seam. There are no transverse joints or seams.

The part B may be made stout and strong enough to enable me to dispense with the outer board covering A, and the rubber sheathing C would in that case form the outermost covering or surface of the roof; or the inner wood lining B may be dispensed with, and the rubber sheathing be fastened to the under surface of the external wood covering A; but for box freight-cars I prefer the three layers; and I find that some advantages may be secured, especially in the way of excluding heat, by having an air space or chamber between the outer covering A and the non-conducting sheathing C. This air-chamber should be provided with suitable openings or passages *x x*, of any desired number, to secure free currents and ventilation between the rubber and the outer covering. They thus prevent dampness, mold, or tendency to rot or decay, and let out the water, if any, which may get within the chamber.

These passages may be at the sides, or at the ends, or both, and also may be made to communicate with the interior of the car.

When no air-chamber is employed it may be found advantageous in some cases to fasten the rubber lining, both to the upper and lower layer, by means of cement or otherwise.

The boards of the roof may be laid either longitudinally or transversely, and may be flat or arched; or the external boards may extend diagonally from the edges to the center of the roof; and those of the internal layer may also be laid diagonally, and in the same or in a reverse direction with those of the outer layer.

The lower boards B, in particular, since they are covered with the rubber or packing, may be of common lumber, and extend lengthwise of the car. In this way the cost of construction is lessened and fewer cross-supports are needed.

For the decks of vessels, or for cabin-roofs, the india-rubber or rubber packing is laid on boards, or other suitable material, and is fastened in any suitable way, by cement, tacks, or otherwise. The rubber or packing may, for such purpose, have cloth or duck on one or both sides. The upper layer may then be painted with mineral paint, and sanded or coated with any other suitable material, the object being to preserve the duck or ducking and make a good walking-surface. I prefer that the rubber in such case be about one-thirty-second or one-twenty-fourth of an inch in thickness, and that the duck be about the same, or a little thicker; but I do not limit myself to these thicknesses. I also prefer that the duck be incorporated with the rubber, so that the two shall be integral, and I thus obviate the necessity of first laying one separately, and then covering it with the other. Boards may be laid over the rubber and duck, if desired.

I claim—

1. The combination of the internal lining B and india-rubber, or the material termed "rubber packing," substantially as described.

2. The combination of the india-rubber or rubber packing and the outer covering A, substantially as described.

3. The combination of an external covering, A, an internal lining, B, and an intermediate layer of india-rubber, or the material termed "rubber packing," substantially as and for the purpose described.

4. The combination of an outer covering, an internal lining, an intermediate sheathing of india-rubber, or the material termed "rubber packing," and an air-chamber, such air-chamber lying between the outer covering and the rubber, and having openings *x*, the whole being constructed substantially in the manner and for the purpose described.

JOHN M. AYER.

Witnesses:
HENRY RIEKE,
W. O. VAN EVERY,
E. T. PRINDLE.